US012683509B2

(12) United States Patent
Oshima

(10) Patent No.: US 12,683,509 B2
(45) Date of Patent: Jul. 14, 2026

(54) SWITCHING POWER SUPPLY

(71) Applicant: CANON KABUSHIKI KAISHA, Tokyo (JP)

(72) Inventor: Mitsunori Oshima, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 18/785,600

(22) Filed: Jul. 26, 2024

(65) Prior Publication Data

US 2025/0038671 A1 Jan. 30, 2025

(30) Foreign Application Priority Data

Jul. 26, 2023 (JP) ................................. 2023-121555

(51) Int. Cl.
| | |
|---|---|
| *H02M 5/458* | (2006.01) |
| *H02M 1/00* | (2006.01) |
| *H02M 1/08* | (2006.01) |
| *H02M 1/42* | (2007.01) |
| *H02M 7/538* | (2007.01) |
| *H02M 7/5387* | (2007.01) |
| *H02M 1/36* | (2007.01) |
| *H02M 7/06* | (2006.01) |

(52) U.S. Cl.
CPC ....... *H02M 5/4585* (2013.01); *H02M 1/0003* (2021.05); *H02M 1/083* (2013.01); *H02M 1/4283* (2021.05); *H02M 7/53803* (2013.01); *H02M 7/53871* (2013.01); *H02M 1/36* (2013.01); *H02M 5/458* (2013.01); *H02M 7/062* (2013.01)

(58) Field of Classification Search
CPC ............. H02M 5/4585; H02M 1/0003; H02M 1/4283; H02M 5/458; H02M 1/0048; H02M 1/007; H02M 1/083; H02M 1/342; H02M 7/062; H02M 7/53803; H02M 7/53871; H02M 1/36; H02M 1/0016; H02M 1/0022; H02M 5/453; H02M 5/40
See application file for complete search history.

(56) References Cited

FOREIGN PATENT DOCUMENTS

| | | | | |
|---|---|---|---|---|
| JP | H06222845 A | * | 8/1994 | |
| JP | 2008070285 A | | 3/2008 | |
| JP | 2008160996 A | | 7/2008 | |
| JP | 2013162719 A | | 8/2013 | |
| JP | 6274287 B1 | * | 2/2018 | ......... G01R 19/0092 |

* cited by examiner

*Primary Examiner* — Crystal L Hammond
*Assistant Examiner* — Jonathan Walter Soileau
(74) *Attorney, Agent, or Firm* — Canon U.S.A., Inc. IP Division

(57) ABSTRACT

A switching power supply includes a rectifier unit that subjects the AC power supply to rectification, a smoothing capacitor that smooths a rectified voltage, a switching unit disposed in parallel with the smoothing capacitor, a voltage detection circuit disposed between the AC power supply and the rectifier unit, a first switch element disposed between the AC power supply and the voltage detection circuit, a second switch element disposed between the rectifier unit and the smoothing capacitor, and a control unit. When the AC power supply, and the smoothing capacitor and the switching unit are connected, the second switch element is made conductive at a zero crossing point of the AC power supply.

9 Claims, 4 Drawing Sheets

SWITCHING POWER SUPPLY

BACKGROUND

Field of the Disclosure

The present disclosure relates to a switching power supply.

Description of the Related Art

In a device including a switching power supply that uses an alternating-current (AC) power supply as a power source, a switch element may be provided to control connection between the AC power supply and the switching power supply. In addition, the switching power supply may generally include electrostatic capacitance, such as an across-the-line capacitor (hereinafter, an X capacitor) or a primary smoothing capacitor, near an input terminal of the AC power supply. When such a switching power supply and an AC power supply are connected with a switch element, an inrush current flows through the electrostatic capacitance according to an instantaneous value of the voltage of the AC power supply at the moment when the switch element becomes conductive, and an element in a circuit may fail due to an overcurrent. If the switch element can be brought into conduction near a zero crossing point where an absolute value of the instantaneous value of the AC power supply becomes small, the inrush current can be suppressed. However, if the switch element is a relay, it is difficult to precisely control the timing at which a contact becomes conductive. For this reason, there has been discussed a method by which a semiconductor switch element, such as a thyristor, is disposed in addition to a relay in a path through which an inrush current flows (Japanese Patent Application Laid-Open No. 2008-160996). In the switching power supply discussed in Japanese Patent Application Laid-Open No. 2008-160996, a zero crossing point is detected by detecting the voltage of a primary smoothing capacitor, and the semiconductor switch element is brought into conduction at the zero crossing point to suppress the inrush current.

However, in the switching power supply discussed in Japanese Patent Application Laid-Open No. 2008-160996, the voltage of the primary smoothing capacitor that is detected to detect the zero crossing point does not drop to a value corresponding to the instantaneous value of the AC power supply when a load of the switching power supply is small. Thus, when the load of the switching power supply is small, the zero crossing point may not be detected. If the zero crossing point cannot be detected, a problem may arise that low-noise operation cannot be performed in the switching power supply.

SUMMARY

The present disclosure is directed to providing a switching power supply that can suppress an inrush current when connected to an AC power supply and can detect a zero crossing point of the AC power supply regardless of a load.

According to an aspect of the present disclosure, a switching power supply includes a rectifier unit to which a single-phase alternating-current (AC) power supply having a first phase and a second phase is connected and that is configured to subject the AC power supply to full-wave rectification, a smoothing capacitor configured to smooth an output voltage of the rectifier unit, a switching unit disposed in parallel with the smoothing capacitor, a first switch element provided in the first phase or the second phase, a second switch element disposed between the rectifier unit and a high potential side of the smoothing capacitor, a first voltage detection circuit disposed between the first switch element and the rectifier unit, a second voltage detection circuit provided in one of the first phase and the second phase being opposite to the phase in which the first switch element is provided, and a control unit, wherein the control unit detects zero crossing of the AC power supply based on an output of at least one of the first voltage detection circuit and the second voltage detection circuit, and wherein after having brought the first switch element into conduction, the control unit brings the second switch element into conduction in synchronization with the zero crossing.

According to another aspect of the present disclosure, a switching power supply includes a rectifier unit to which a single-phase alternating-current (AC) power supply having a first phase and a second phase is connected and that is configured to subject the AC power supply to full-wave rectification, a smoothing capacitor configured to smooth an output voltage of the rectifier unit, a switching unit disposed in parallel with the smoothing capacitor, a first switch element provided in the first phase or the second phase, a second switch element provided in one of the first phase and the second phase being opposite to the phase in which the first switch element is provided, a voltage detection circuit disposed between the AC power supply and the second switch element, and a control unit, wherein the control unit detects zero crossing of the AC power supply based on an output of the voltage detection circuit, and wherein after having brought the first switch element into conduction, the control unit brings the second switch element into conduction in synchronization with the zero crossing.

Further features of the present disclosure will become apparent from the following description of exemplary embodiments with reference to the attached drawings.

DESCRIPTION OF THE EMBODIMENTS

A switching power supply 100 according to a first exemplary embodiment is an alternating current (AC)-AC inverter that supplies AC power of any frequency to an insulated heating member and that can characteristically suppress an inrush current that flows through a smoothing capacitor C1 when an AC power supply 10 is connected to the switching power supply 100. Hereinafter, a circuit configuration of the switching power supply 100 will be described, and then operations of the switching power supply 100 will be described.

Figure 1:
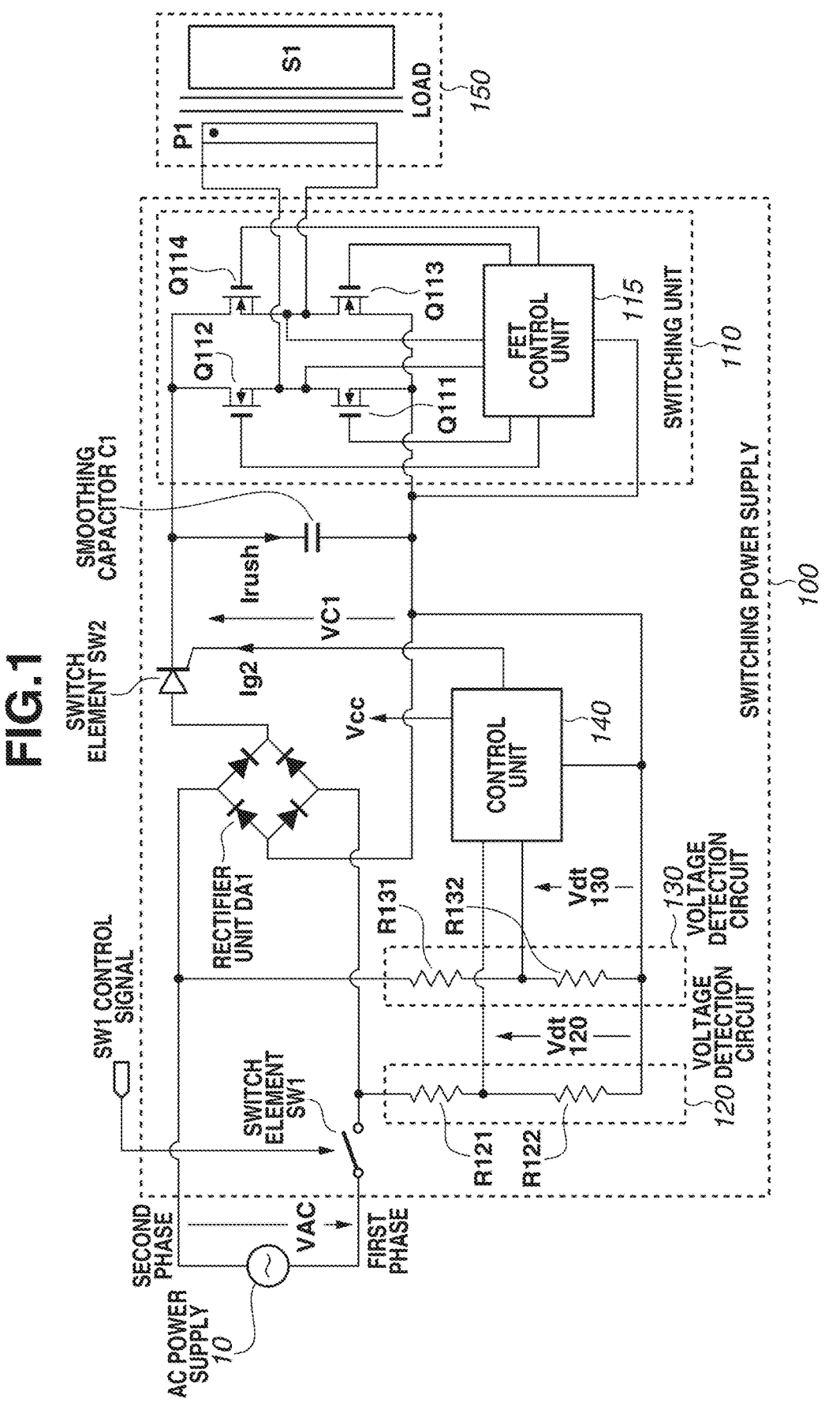
FIG. 1 is a schematic diagram of a switching power supply according to one or more aspects of the present disclosure.

First, the circuit configuration of the switching power supply 100 will be described with reference to FIG. 1. The switching power supply 100 includes a rectifier unit DA1, a smoothing capacitor C1, a switch element SW1 (first switch element), a switch element SW2 (second switch element), and a switching unit 110. The switching power supply 100 further includes a voltage detection circuit 120 (first voltage detection circuit), a voltage detection circuit 130 (second voltage detection circuit), and a control unit 140. The switch element SW2 is disposed between the rectifier unit DA1 and a high potential side of the smoothing capacitor C1.

The switching power supply 100 supplies power to a load 150 by switching operation of the switching unit 110, thereby causing a heating member S1 on a secondary side insulated from the AC power supply 10 to generate heat. The switching power supply 100 adjusts the power to be supplied to the load 150 so that the temperature of the heating member S1 is constant. In the present exemplary embodiment, the switching power supply 100 is used as an AC-AC inverter, but it may be used as a switching power supply other than an AC-AC inverter. For example, the switching power supply 100 may be used as an AC-direct current (DC) converter if the heating member S1 is replaced by a diode and a capacitor and an output voltage is set as the control target.

The AC power supply 10 is a single-phase AC power supply and supplies AC power to the switching power supply 100 through a first phase and a second phase. A voltage VAC has an instantaneous value of the voltage between the first phase and the second phase.

An effective voltage value and frequency of the AC power supply 10 are respectively 100 root-mean-square voltages (Vrms) and 60 hertz (Hz), for example.

The rectifier unit DA1 is a diode bridge formed of four diodes, and subjects the AC power supply 10 to full-wave rectification, and outputs a resulting current to the smoothing capacitor C1 and the switching unit 110. Although the rectifier unit DA1 is a diode bridge in the present exemplary embodiment, a circuit that performs a similar function may be used instead, such as a power factor correction (PFC) circuit using a switching element such as a field effect transistor (hereinafter, referred to as FET).

The smoothing capacitor C1 is disposed to smooth an output of the rectifier unit DA1 or to prevent switching noise generated in the switching unit 110 from propagating to the AC power supply 10. A voltage VC1 is the voltage of the smoothing capacitor C1, and a current Irush is the current flowing through the smoothing capacitor C1. In general, a switching power supply often includes a primary smoothing capacitor that is a capacitor with a large electrostatic capacitance and a low allowable ripple current, such as an aluminum electrolytic capacitor. In the present exemplary embodiment, however, a film capacitor with a small electrostatic capacitance and a high allowable ripple current is used. This is because the load of the switching unit 110 is large and it is necessary to reduce a board size of the switching power supply 100. In the present exemplary embodiment, the heating member S1 to which the switching power supply 100 supplies power has a large rated load (for example, 1000 W or more), and thus the ripple current flowing through the smoothing capacitor C1 during rated operation becomes very large. Thus, in order to use a capacitor with a low allowable ripple current, such as an aluminum electrolytic capacitor, as the smoothing capacitor C1, it is necessary to connect many capacitors in parallel to satisfy the ripple current rating, which will increase the board size. For the above reason, in the present exemplary embodiment, a film capacitor is used as the smoothing capacitor C1. Since the smoothing capacitor C1 has a small electrostatic capacitance, when the switching unit 110 is performing a rated operation, the voltage of the smoothing capacitor C1 does not have a smoothed voltage waveform but has a waveform almost equal to the waveform obtained by subjecting the AC power supply 10 to full-wave rectification. The voltage waveform of the smoothing capacitor C1 will be described with reference to FIG. 3. If an excessive board size is not a problem, an aluminum electrolytic capacitor or the like may be used instead of a film capacitor.

The switch element SW1 is a relay having a mechanical contact, and is a switch element disposed between the AC power supply 10 and the switching power supply 100 in order to control connection and disconnection between the AC power supply 10 and the switching power supply 100. The switch element SW1 is controlled to be turned on and off by a SW1 control signal output from a control unit (not illustrated) of a device equipped with the switching power supply 100 and the load 150. When the SW1 control signal is at an H level, the switch element SW1 is turned on, and when the SW1 control signal is at an L level, the switch element SW1 is turned off. A circuit that controls the switch element SW1 turns on the switch element SW1 when it is necessary to supply power to the switching power supply 100. Since the voltage detection circuits 120 and 130 are brought into conduction by the switch element SW1 can detect the instantaneous voltage value of the AC power supply 10, the control unit 140 can detect the zero crossing point, which is a point of time when the instantaneous voltage value of the AC power supply 10 becomes 0 V. The control unit 140 detects the zero crossing point of the AC power supply 10 based on the output of at least one of the voltage detection circuits 120 and 130. In the present exemplary embodiment, the switch element SW1 is disposed in the first phase of the AC power supply 10. However, there is no problem if the switch element SW1 is disposed in the second phase of the AC power supply 10 as long as the switch element SW1 is closer to the AC power supply 10 than the voltage detection circuit 130. The SW1 control signal may be output by the control unit 140, not by the control unit of the device equipped with the switching power supply 100.

The switch element SW2 is a three-terminal thyristor, and is a switch element for controlling the connection and disconnection between the rectifier unit DA1, and the smoothing capacitor C1 and the switching unit 110. The switch element SW2 is controlled by a control current Ig2 output from the control unit 140, and is turned on when it is necessary to connect the AC power supply 10 to the smoothing capacitor C1 and the switching unit 110. The switch element SW2 is turned on in a state where the switch element SW1 is turned on to suppress an inrush current to the smoothing capacitor C1 and near the zero crossing point of the AC power supply 10. A relationship between the control method of the switch elements SW1 and SW2 and the inrush current to the smoothing capacitor C1 will be described with reference to FIG. 2. In the present exemplary embodiment, as the switch element SW2, a three-terminal thyristor is used. However, the switch element SW2 does not need to be a three-terminal thyristor. Any switch element can be used as long as the time it takes from receiving a control signal to becoming conductive for the switch element SW2 is sufficiently shorter than that for the switch element SW1. For example, a bidirectional three-terminal thyristor (hereinafter, referred to as triac) or a P-channel FET may be used. In addition, a P-type three-terminal thyristor is used in the present exemplary embodiment, but an N-type three-terminal thyristor may be used instead.

The switching unit 110 is a full-bridge switching circuit formed of FETs Q111, Q112, Q113, and Q114 and an FET control unit 115, and supplies power of any frequency to the load 150. The FETs Q111 and Q112 are controlled to be turned on and off complementarily with a dead time interposed therebetween, and controlled to have an identical on-time and off-time excluding the dead time. Similarly, the FETs Q113 and Q114 are controlled to be turned on and off complementarily with a dead time interposed therebetween, and controlled to have the identical on-time and off-time excluding the dead time. In addition, the on-times and the off-times of the FETs Q111, Q112, Q113, and Q114 have the same values, and the dead times have a common value.

The switching unit 110 controls output power by performing phase shift control that shifts switch-on/off phases of the FETs Q111 and Q112 and switch-on/off phases of the FETs Q113 and Q114. When a phase shift amount is 0 radian (rad), the FETs Q111 and Q113 switch on and off simultaneously, and the FETs Q112 and Q114 switch on and off simultaneously. When the phase shift amount is 0 rad, the FETs Q111 and Q114 or the FETs Q112 and Q113 do not turn on simultaneously, and thus no current flows through the load 150, and the output power of the switching unit 110 is 0 W. When the phase shift amount is increased from 0 rad, a period during which the FETs Q111 and Q114 are turned on simultaneously increases and a period during which the FETs Q112 and Q113 are turned on simultaneously increases, so that the output power of the switching unit 110 also increases. The output power of the switching unit 110 is at the maximum when the phase shift amount is $\pi$ rad.

In the present exemplary embodiment, a full-bridge circuit is used as the switching unit 110. However, a switching circuit of another type may be used as long as the switching circuit can control the frequency and the output power independently. For example, an active-clamp power supply, such as a switching power supply 200 of a second exemplary embodiment, may be used.

The voltage detection circuit 120 is a circuit for detecting the voltage of the AC power supply 10, and is formed of resistors R121 and R122. The voltage detection circuit 120 outputs a voltage Vdt120 obtained by subtracting a forward voltage or reverse voltage of a diode constituting the rectifier unit DA1 from the instantaneous voltage value VAC of the AC power supply 10, and dividing the voltage by the resistors R121 and R122. When the switch element SW1 is conducting, the forward voltage is applied to the diode constituting the rectifier unit DA1 during a period in which the first phase of the AC power supply 10 is at a higher potential than the second phase. Thus, during the period in which the first phase of the AC power supply 10 is at a higher potential than the second phase, the voltage Vdt120 obtained by subtracting the forward voltage of the diode constituting the rectifier unit DA1 from the instantaneous voltage value VAC of the AC power supply 10 and dividing the voltage by the resistors R121 and R122 is output to the control unit 140. On the other hand, during a period in which the first phase of the AC power supply 10 is at a lower potential than the second phase, the instantaneous voltage value VAC of the AC power supply 10 is all applied as the reverse voltage to the diode of the rectifier unit DA1, so that the voltage Vdt120 is 0 V. When the switch element SW1 is not conducting, the voltage of the AC power supply 10 is all applied to the switch element SW1, so that the output voltage Vdt120 of the voltage detection circuit 120 is 0 V regardless of the phase of the AC power supply 10.

The voltage detection circuit 130 is a circuit for detecting the voltage of the AC power supply 10, similar to the voltage detection circuit 120, and is formed of resistors R131 and R132. The voltage detection circuit 130 outputs a voltage Vdt130 obtained by subtracting the forward voltage or reverse voltage of the diode constituting the rectifier unit DA1 from the instantaneous voltage value VAC of the AC power supply 10, and dividing the voltage by the resistors R131 and R132. When the switch element SW1 is conducting, the forward voltage is applied to the diode constituting the rectifier unit DA1 during a period in which the second phase of the AC power supply 10 is at a higher potential than the first phase. Thus, during the period in which the second phase of the AC power supply 10 is at a higher potential than the first phase, the voltage Vdt130 obtained by subtracting the forward voltage of the diode constituting the rectifier unit DA1 from the instantaneous voltage value VAC of the AC power supply 10 and dividing the voltage by the resistors R131 and R132 is output to the control unit 140. On the other hand, during a period in which the second phase of the AC power supply 10 is at a lower potential than the first phase, the instantaneous voltage value VAC of the AC power supply 10 is all applied as a reverse voltage to the diode of the rectifier unit DA1, so that the voltage Vdt130 is 0 V. When the switch element SW1 is not conducting, the voltage of the AC power supply 10 is all applied to the switch element SW1, so that the output voltage Vdt130 of the voltage detection circuit 130 is 0 V regardless of the phase of the AC power supply 10.

In the present exemplary embodiment, a circuit for detecting the instantaneous voltage value VAC of the AC power supply 10 is used to detect the zero crossing point of the AC power supply 10. However, it is not necessarily required to use a circuit that detects the voltage value as long as a circuit that can detect the zero crossing point is used. For example, a circuit that outputs a digital signal whose logic changes depending on the phase of the AC power supply 10 or a circuit that outputs a pulse signal at each zero crossing point may be used.

The control unit 140 is a circuit that detects the output voltages of the voltage detection circuits 120 and 130, and outputs the control current Ig2 of the switch element SW2 using a voltage Vcc as a power source. The control unit 140 determines that the zero crossing point of the AC power supply 10 is reached when the sum of the output voltage Vdt120 of the voltage detection circuit 120 and the output voltage Vdt130 of the voltage detection circuit 130 is equal to or less than a threshold value. In the present exemplary embodiment, the control unit 140 and the FET control unit 115 are separate circuits, but either the control unit 140 or the FET control unit 115 may control both the FETs Q111 to Q114 and the switch element SW2. In the present exemplary embodiment, the control unit 140 sets reference potentials of the voltage detection circuits 120 and 130 to the same potential as that of a low potential side of the smoothing capacitor C1, but another point may be set as the reference potential. For example, the reference potential of the control unit 140 may be set on the secondary side insulated from the AC power supply 10, and the switch element SW2 may be controlled via an element such as a photocoupler.

The inductive load 150 has a primary inductance P1 electrically connected to the switching unit 110, and the secondary-side load (heating member) S1 magnetically connected to the primary inductance P1. The primary inductance P1 and the heating member S1 are magnetically coupled, and the heating member S1 is supplied with power from the primary inductance P1 by the switching operation of the switching unit 110. When power is supplied from the primary inductance P1, a current flows through the heating member S1, and the heating member S1 generates heat due to Joule heat caused by electrical resistance of the heating member S1 itself. In the present exemplary embodiment, the load 150 is separated into the primary side and the secondary side. However, depending on the safety design of the device using the switching power supply, a configuration equivalent to reinforced insulation or double insulation in terms of the safety standard is not essential between the primary inductance P1 and the heating member S1.

Next, a control method of the switch elements SW1 and SW2 and an inrush current flowing through the smoothing capacitor C1 will be described with reference to FIG. 2.

Figure 2:
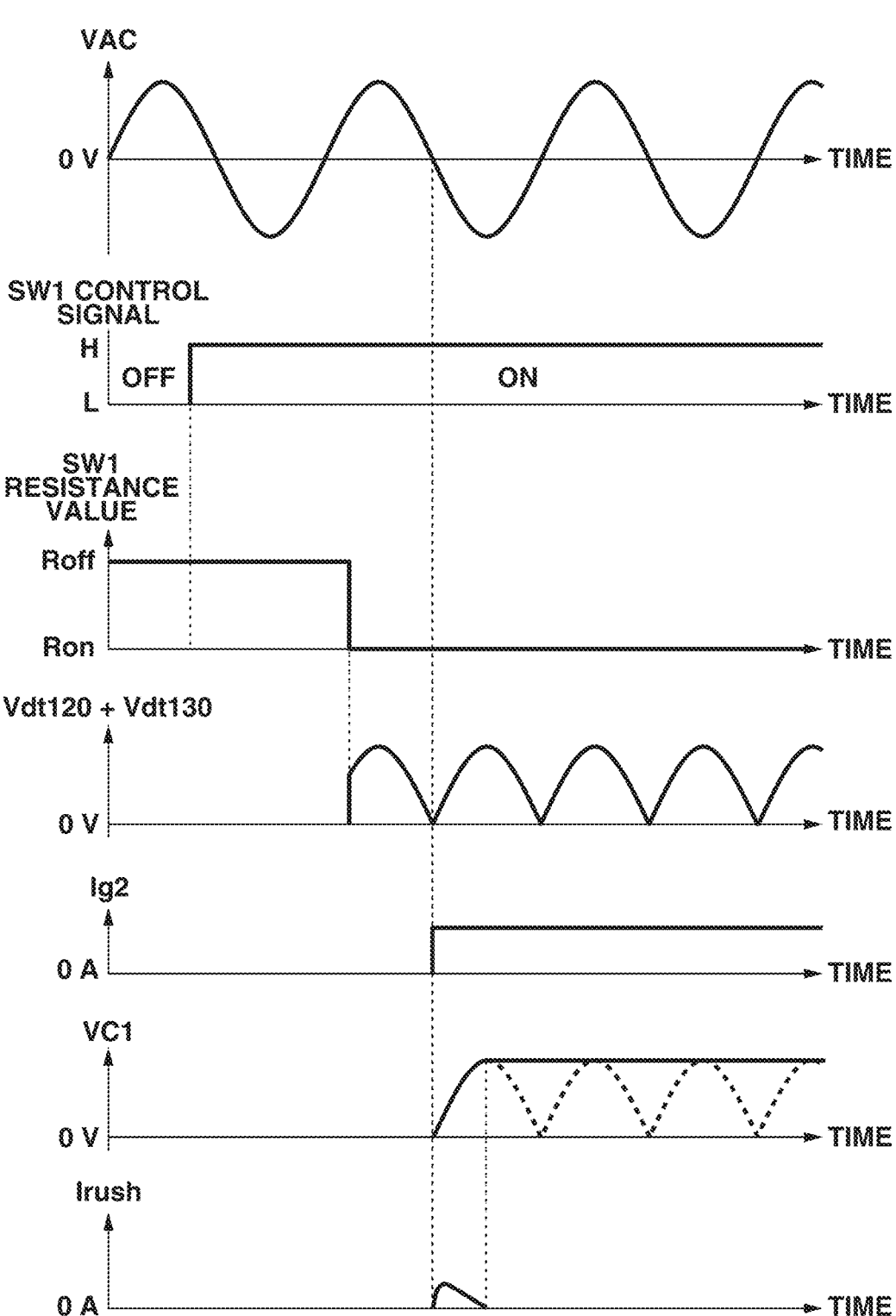
FIG. 2 is a schematic diagram illustrating operating waveforms of the switching power supply according to one or more aspects of the present disclosure.

FIG. 2 is a diagram illustrating transition in voltage, current, and the like of each part of the switching power supply 100 when the switch elements SW1 and SW2 are turned on, with time plotted on each horizontal axis. FIG. 2 illustrates, from the top, the instantaneous voltage value VAC of the AC power supply 10, the SW1 control signal, the resistance value of the switch element SW1, and the sum Vdt120+Vdt130 of the output voltages of the voltage detection circuits 120 and 130. FIG. 2 further illustrates the control current Ig2 of the switch element SW2, the voltage VC1 of the smoothing capacitor C1, and the current Irush flowing through the smoothing capacitor C1.

When the SW1 control signal is at the L level, the contact of the switch element SW1 that is a relay is not conducting, the resistance value of the switch element SW1 is a very high value Roff (for example, 1000 megaohm (MΩ) or more), and the AC power supply 10 and the switching power supply 100 are not connected. The sum Vdt120+Vdt130 of the output voltages of the voltage detection circuits 120 and 130 is 0 V. Further, the control current Ig2 of the switch element SW2 is also 0 A, and thus the switch element SW2 is not turned on, the voltage VC1 of the smoothing capacitor C1 is 0 V, and the current Irush is 0 A.

When the SW1 control signal switches to the H level, the mechanical contact of the switch element SW1 that is a relay starts to make contact. However, the resistance value of the switch element SW1 remains at Roff until complete contact is made. The time between an instant when the SW1 control signal switches to the H level and an instant when the contact of the switch element SW1 comes into contact is 15 msec, for example.

When the contact of the switch element SW1 is completely in contact and the resistance value of the switch element SW1 is switched from Roff to Ron (i.e., when the switch element SW1 becomes conductive), the voltage detection circuit 120 or 130 can detect the voltage of the AC power supply 10. In FIG. 2, since the instantaneous voltage value VAC at the moment when the switch element SW1 becomes conductive is greater than 0 V, the output voltage Vdt120 of the voltage detection circuit 120 has a value proportional to the instantaneous voltage value VAC of the AC power supply 10.

On the other hand, the output voltage Vdt130 of the voltage detection circuit 130 becomes 0 V. Since the control unit 140 can detect the instantaneous voltage value VAC of the AC power supply 10 by the sum Vdt120+Vdt130 of the output voltages, the control unit 140 can detect the zero crossing point of the AC power supply 10 when the switch element SW1 becomes conductive. In FIG. 2, the forward voltage of the diode constituting the rectifier unit DA1 is ignored because it is sufficiently small compared to the maximum value of the voltage VAC.

When the switch element SW1 becomes conductive and the voltage detection circuits 120 and 130 can detect the voltage VAC of the AC power supply 10, the control unit 140 starts to cause the control current Ig2 to flow in synchronization with the zero crossing point of the AC power supply 10. Unlike the switch element SW1 that is a relay, the switch element SW2, which is a three-terminal thyristor, becomes conductive in a very short time (for example, several u to several tens of u seconds) after the control current Ig2 starts to flow. Thus, the AC power supply 10 and the smoothing capacitor C1 are connected almost simultaneously with the next zero crossing point at which the switch element SW1 is turned on. Since the voltage applied to the smoothing capacitor C1 at the point of time when the smoothing capacitor C1 is connected to the AC power supply 10 is almost 0 V, the current Irush that flows when the smoothing capacitor C1 is connected to the AC power supply 10 has as a very small value, such as several amperes (A) or less.

In the present exemplary embodiment, the control unit 140 continues to cause the control current Ig2 to flow after starting the flow, which is for the purpose of simplifying control. As long as the switch element SW2 is continuously on, transition of the control current Ig2 does not need to be stepwise as in FIG. 2. For example, if the switch element SW2 is a three-terminal thyristor or a triac, the control current Ig2 may be controlled to flow in a pulsed manner at each zero crossing point.

Next, the reason why the switch elements SW1 and SW2 are controlled as illustrated in FIG. 2 and the reason why the voltage detection circuits 120 and 130 are disposed closer to the AC power supply 10 than the rectifier unit DA1 will be described.

In general, an inrush current flowing when a capacitor is connected to a power source increases in proportion to the voltage of the power source and the electrostatic capacitance of the capacitor. Thus, in a switching power supply, an inrush current flows through a primary smoothing capacitor, the magnitude of which corresponds to the instantaneous value of an AC power supply at the moment when the switching power supply is connected to the AC power supply and to the electrostatic capacitance of the primary smoothing capacitor. With the voltage of a general commercial AC power supply (for example, 0 V to 141 V) and the electrostatic capacitance of a general primary smoothing capacitor (several tens of microfarad (µF) to several thousands of µF), the inrush current may be a large current of 100 A or more. Thus, it is essential to take measures to prevent failure of elements. As an example of such measures, there is a means for reducing the inrush current by providing a filter element, such as a power thermistor or a harmonic choke coil, in a path through which the inrush current flows. However, such a filter element that can suppress an inrush current of more than 100 A is often large in size.

In the present exemplary embodiment, the inrush current is suppressed by controlling the timing at which the switching power supply 100 is connected to the AC power supply 10 to keep the absolute value of the instantaneous voltage value of the AC power supply low at the moment when the primary smoothing capacitor is connected to the AC power supply. When the switch elements SW1 and SW2 are controlled as in the present exemplary embodiment, the absolute value of the instantaneous voltage value VAC of the AC power supply 10 when the switching power supply 100 is connected to the AC power supply 10 becomes very small, and the inrush current to the smoothing capacitor C1 is suppressed to several A or less.

If the purpose is to suppress the inrush current as described above, the switch element SW2 may be turned on in synchronization with the zero crossing point, and there is no need to dispose the switch element SW1. In the present exemplary embodiment, however, the switch elements SW1 and SW2 are used together from the viewpoint of safety. In the case of controlling the connection and disconnection between the AC power supply 10 and the switching power supply 100 only by the switch element SW1, it is difficult to suppress the inrush current only by the switch element SW1 because the relay cannot precisely control the time it takes to become conductive due to an influence of individual variation of elements. On the other hand, the switch element SW2 needs to be a semiconductor switch element that takes a short time to become conductive. Therefore, the switching power supply 100 uses both the switch element SW1 that is a relay having a mechanical contact and the switch element SW2 that is a semiconductor, and uses each of them as a protection means, thereby achieving both suppression of the inrush current and provision of safer protection circuits.

The voltage detection circuits 120 and 130 are disposed closer to the AC power supply 10 than the rectifier unit DA1 in order to detect the instantaneous voltage value VAC of the AC power supply 10 even when the switch element SW2 is conducting. Even if the voltage detection circuits 120 and 130 are connected on an output terminal side of the rectifier unit DA1 rather than on an input terminal side, the voltage detection circuits 120 and 130 can detect the instantaneous voltage value VAC of the AC power supply 10 as long as the switch element SW2 is not conducting.

However, if the voltage detection circuits 120 and 130 are disposed between the rectifier unit DA1 and the switch element SW2, the control unit 140 will detect the voltage of the smoothing capacitor C1, not the voltage of the AC power supply 10, when the switch element SW2 is conducting. The smoothing capacitor C1 is charged by the AC power supply 10 and discharged by the switching unit 110. Thus, if power stored in the smoothing capacitor C1 is larger than the output power of the switching unit 110, there occurs a period during which the voltage of the smoothing capacitor C1 does not drop completely and the instantaneous voltage value VAC of the AC power supply 10 cannot be detected around the zero crossing point. In other words, if the output power of the switching unit 110 is small when the switch element SW2 is conducting, the switching power supply 100 cannot detect the zero crossing point of the AC power supply 10. If the zero crossing point cannot be detected in controlling the switching unit 110, the absolute value of the instantaneous voltage value VAC of the AC power supply 10 may become large at the timing when the switching operations of the FETs Q111 to Q114 start. Since the load 150 of the switching unit 110 is inductive, when a current starts to flow into the load 150 when the absolute value of the instantaneous voltage value VAC of the AC power supply 10 is large, a large noise may be generated in the switching unit 110 and the load 150 and propagate to terminals of the AC power supply 10. Therefore, if switching cannot be started from the zero crossing point, i.e., if the output power of the switching power supply 100 is small, the noise generated in the switching power supply 100 may become large.

Thus, in the present exemplary embodiment, the voltage detection circuits 120 and 130 are disposed closer to the AC power supply 10 than the rectifier unit DA1 in order to enable the zero crossing point to be detected even if the output power of the switching unit 110 is small.

Therefore, according to the present exemplary embodiment, it is possible to provide the switching power supply that can suppress an inrush current when connected to an AC power supply and detect a zero crossing point of the AC power supply regardless of a load.

A switching power supply 200 of a second exemplary embodiment differs from the switching power supply 100 of the first exemplary embodiment in that a switch element SW3 is used instead of the switch element SW2, only one voltage detection circuit is used, a switching unit is differently configured, and a capacitor CX is included. Hereinafter, a circuit configuration of the switching power supply 200 and a control method of switch elements SW1 and SW3 will be described. The same components of the switching power supply 200 as those of the switching power supply 100 according to the first exemplary embodiment are given the same reference signs, and descriptions thereof are omitted.

Figure 3:
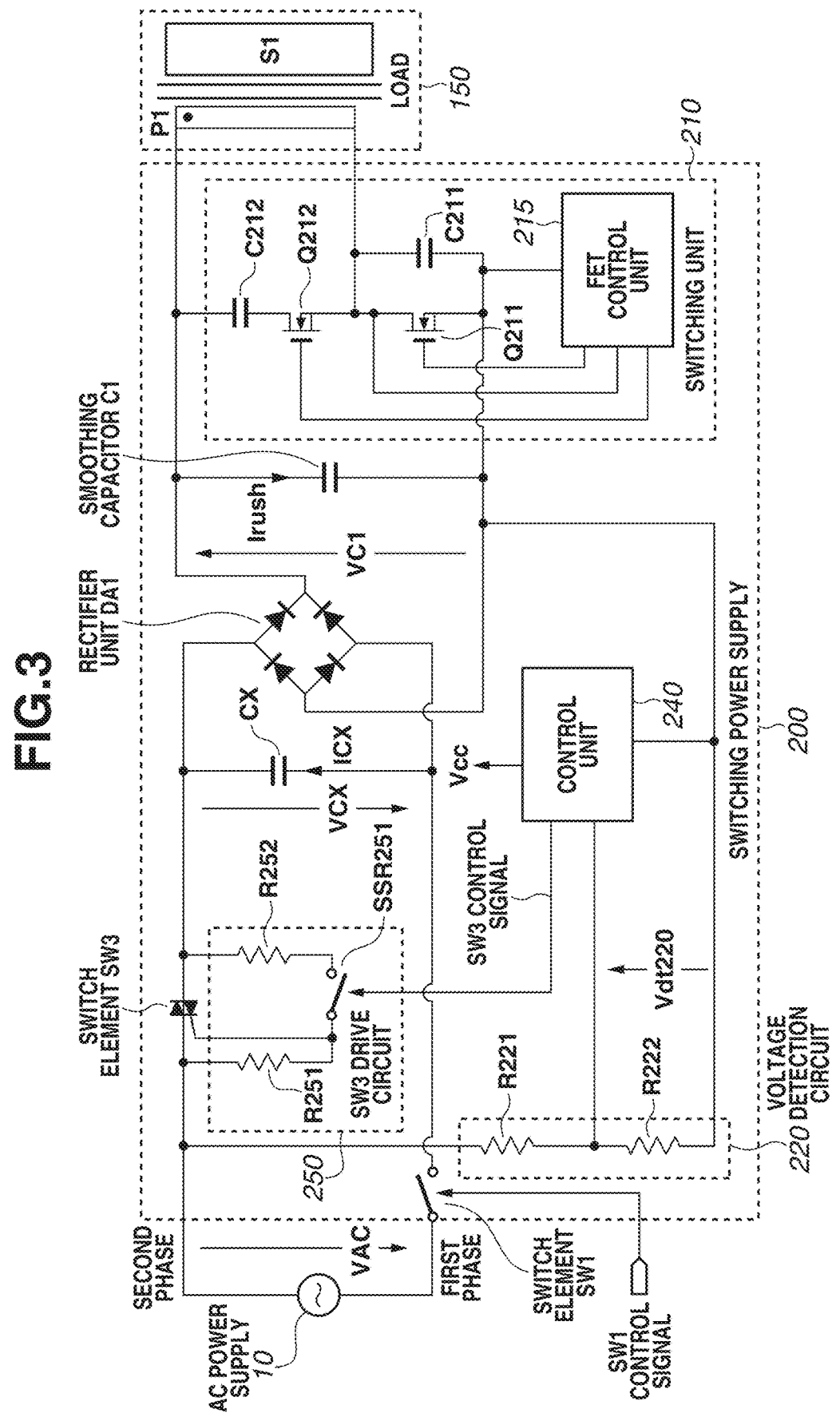
FIG. 3 is a schematic diagram of a switching power supply according to one or more aspects of the present disclosure.

First, the circuit configuration of the switching power supply 200 will be described with reference to FIG. 3. The capacitor CX is an X capacitor that is disposed between the input terminals of the rectifier unit DA1 in order to prevent switching noise generated in a switching unit 210 from propagating to the AC power supply 10. A voltage applied to the capacitor CX will be designated as VCX, and a current flowing through the capacitor CX will be designated as ICX. The control of the switch elements SW1 and SW3 and the relationship between the voltage VCX and the current ICX will be described with reference to FIG. 4.

The switch element SW3 is a triac, and is a switch element for controlling connection and disconnection between the AC power supply 10, and the capacitor CX and the rectifier unit DA1. The switch element SW3 is controlled by an SW3 control signal sent from a control unit 240 via a SW3 driving circuit 250, and is turned on when it is necessary to connect the AC power supply 10 to a smoothing capacitor C1 and the switching unit 210. The switch element SW3 is turned on in a state where the switch element SW1 is turned on to suppress an inrush current to the capacitor CX and the smoothing capacitor C1 and only near the zero crossing point of the AC power supply 10. A relationship between the control method of the switch elements SW1 and SW3 and the inrush current to the smoothing capacitor C1 and the capacitor CX will be described with reference to FIG. 4.

The switching unit 210 is an active-clamp switching circuit formed of FETs Q211 and Q212, capacitors C211 and C212, and an FET control unit 215, and supplies power of any frequency to the load 150. The FETs Q211 and Q212 are turned on and off complementarily with a dead time interposed therebetween and at any frequency. The FET control unit 215 adjusts the power supplied from the switching unit 210 to the load 150 by changing an on-time ratio of the FET Q211. As the on-time ratio of the FET Q211 is higher, the output power of the switching unit 210 increases.

In the present exemplary embodiment, an active-clamp circuit is used as the switching unit 210. However, a switching circuit of another type may be used as long as the switching circuit can control the frequency and the output power independently. For example, a full-bridge power supply, such as the switching power supply 100 of the first exemplary embodiment, may be used.

A voltage detection circuit 220 is a circuit for detecting the voltage of the AC power supply 10, and is formed of resistors R221 and R222. The voltage detection circuit 220 outputs a voltage Vdt220 obtained by subtracting the forward voltage or reverse voltage of a diode constituting the rectifier unit DA1 from the instantaneous voltage value VAC of the AC power supply 10 and dividing the voltage by the resistors R221 and R222. When the switch element SW1 is conducting, the forward voltage is applied to the diode constituting the rectifier unit DA1 during a period in which the second phase of the AC power supply 10 is at a higher potential than the first phase.

Thus, during the period in which the second phase of the AC power supply 10 is at a higher potential than the first phase, the voltage Vdt220 obtained by subtracting the forward voltage of the diode constituting the rectifier unit DA1 from the instantaneous voltage value VAC of the AC power supply 10 and dividing the voltage by the resistors R221 and R222 is output to the control unit 240. On the other hand, during a period in which the second phase of the AC power supply 10 is at a lower potential than the first phase, the instantaneous voltage value VAC of the AC power supply 10 is all applied as the reverse voltage to the diode of the rectifier unit DA1, so that the voltage Vdt220 is 0 V. When the switch element SW1 is not conducting, the voltage of the AC power supply 10 is all applied to the switch element SW1, so that the output voltage Vdt220 of the voltage detection circuit 220 is 0 V regardless of the phase of the AC power supply 10.

Similar to the voltage detection circuits 120 and 130 according to the first exemplary embodiment, the voltage detection circuit 220 may use a circuit that outputs a digital signal whose logic changes depending on the phase of the AC power supply 10 or a circuit that outputs a pulse signal at each zero crossing point.

The control unit 240 is a circuit that detects the zero crossing point of the AC power supply 10 from the output voltage Vdt220 of the voltage detection circuit 220, and outputs the SW3 control signal using the voltage Vcc as a power source. Unlike the control unit 140 of the first exemplary embodiment, the control unit 240 detects the instantaneous voltage value VAC of the AC power supply 10 only during the period in which the second phase of the AC power supply 10 is at a higher potential than the first phase. Thus, the control unit 240 determines that the AC power supply 10 is at a zero crossing point when the output voltage Vdt220 of the voltage detection circuit 220 is decreasing and is equal to or lower than a threshold value. Similar to the control unit 140 according to the first exemplary embodiment, either the control unit 240 or the FET control unit 215 may control both the FETs Q211 and Q212 and the switch element SW3. In addition, similar to the control unit 140 according to the first exemplary embodiment, the reference potential of the control unit 240 may be set at another point.

The SW3 driving circuit 250 is formed of resistors R251 and R252 and a switch element SSR251, and is a circuit that controls on and off of the switch element SW3 based on the SW3 control signal. When the switch element SSR251 is turned on, the switch element SW3 that is a triac becomes conductive. After that, when the switch element SSR251 is turned off, the switch element SW3 continues to be conductive until the zero crossing point of the AC power supply 10. In the present exemplary embodiment, the switch element SSR251 is a phototriac coupler that is turned on when the SW3 control signal is at the H level, and is turned off when the SW3 control signal is at the L level.

Next, a control method of the switch elements SW1 and SW3 and an inrush current flowing through the smoothing capacitor C1 and the capacitor CX will be described with reference to FIG. 4.

Figure 4:
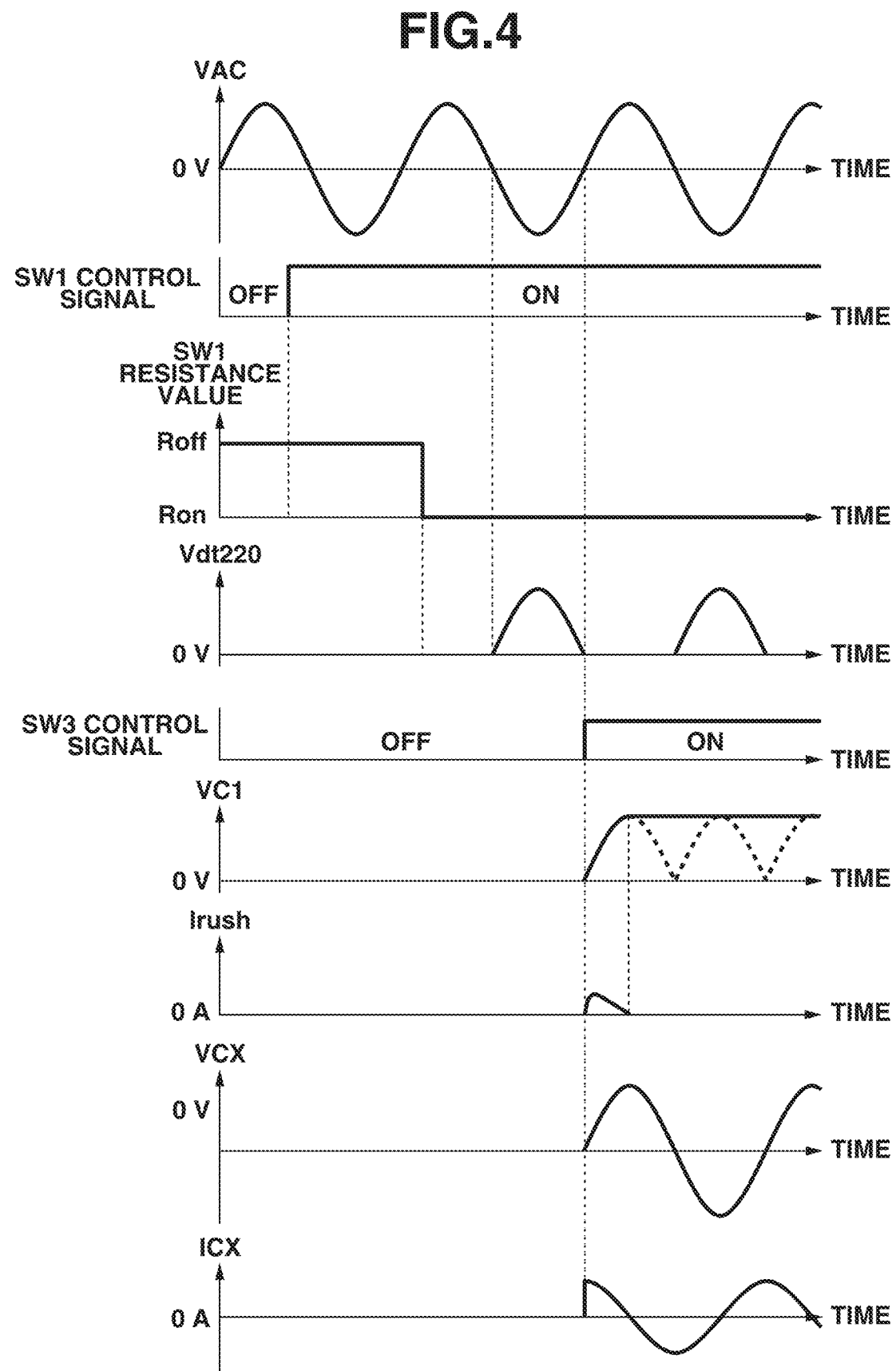
FIG. 4 is a schematic diagram illustrating operating waveforms of the switching power supply according to one or more aspects of the present disclosure.

FIG. 4 is a diagram illustrating transition in voltage, current, and the like of each part of the switching power supply 200 when the switch elements SW1 and SW3 are turned on, with time plotted on each horizontal axis. FIG. 4 illustrates, from the top, the instantaneous voltage value VAC of the AC power supply 10, the SW1 control signal, the resistance value of the switch element SW1, the output voltage Vdt220 of the voltage detection circuit 220, and the SW3 control signal. FIG. 4 further illustrates the voltage VC1 of the smoothing capacitor C1, the current Irush flowing through the smoothing capacitor C1, the voltage VCX of the capacitor CX, and the current ICX flowing through the capacitor CX.

As in the first exemplary embodiment, when the SW1 control signal is at the L level, the contact of the switch element SW1 that is a relay is not conducting, the resistance value of the switch element SW1 is a very high value Roff, and the AC power supply 10 and the switching power supply 200 are not connected. The output voltage Vdt220 of the voltage detection circuit 220 is 0 V. Further, the SW3 control signal is also at the L level, and thus the switch element SW3 is not turned on, the voltages of the smoothing capacitor C1 and the capacitor CX are 0 V, and no current flows.

When the SW1 control signal switches to the H level, the mechanical contact of the switch element SW1 that is a relay starts to make contact. However, as in the first exemplary embodiment, the resistance value of the switch element SW1 remains at Roff until complete contact is made.

When the contact of the switch element SW1 is completely in contact and the resistance value of the switch element SW1 is switched from Roff to Ron (when the switch element SW1 becomes conductive), the instantaneous voltage value VAC of the AC power supply 10 is 0 V or more. Thus, at this point of time, the output voltage Vdt220 of the voltage detection circuit 220 is 0 V. Then, when the instantaneous voltage value VAC of the AC power supply 10 becomes less than 0 V, the output voltage Vdt220 of the voltage detection circuit 220 becomes a voltage proportional to the instantaneous voltage value VAC of the AC power supply 10. After the switch element SW1 becomes conductive, the output voltage Vdt220 of the voltage detection circuit 220 becomes 0 V when the instantaneous voltage value VAC of the AC power supply 10 is 0 V or more, and becomes a voltage proportional to the instantaneous voltage value VAC of the AC power supply 10 when the instantaneous voltage value VAC of the AC power supply 10 is less than 0 V. In FIG. 4, as in FIG. 2, the forward voltage of the diode constituting the rectifier unit DA1 is ignored because it is sufficiently small compared to the maximum value of the voltage VAC.

When the switch element SW1 becomes conductive and the voltage detection circuit 220 can detect the instantaneous voltage value VAC of the AC power supply 10, the control unit 240 changes the SW3 control signal to the H level in synchronization with the zero crossing point of the AC power supply 10. When the SW3 control signal becomes the H level, the SW3 driving circuit 250 turns on the switch element SW3, and the switch element SW3 that is a triac becomes conductive in a very short time (for example, several u to several tens of u seconds). Thus, the AC power supply 10 is connected to the smoothing capacitor C1 and the capacitor CX almost simultaneously with the first zero crossing point after the switch element SW1 becomes conductive and the instantaneous voltage value VAC of the AC power supply 10 becomes less than 0 V. When the AC power supply 10 is connected to the smoothing capacitor C1 and the capacitor CX, a voltage is applied to the smoothing capacitor C1 and the capacitor CX. However, at that point of time, the voltage VC1 applied to the smoothing capacitor C1 and the voltage VCX applied to the capacitor CX are almost 0 V. Therefore, the currents Irush and ICX that flow when the smoothing capacitor C1 and the capacitor CX are connected to the AC power supply 10 each have a very small value, such as several A or less.

Controlling the switch elements SW1 and SW3 as described above makes it possible to reduce the inrush current occurring when the AC power supply 10 and the switching power supply 200 are connected.

The reason why an active-clamp circuit is adopted as the switching power supply 200 according to the present exemplary embodiment, unlike the switching power supply 100 of the first exemplary embodiment, is to reduce the size and cost of the switching power supply. Power generated by the switching element of a switching power supply generally tends to increase as the output power is larger. Therefore, in a switching power supply with an output power of 1000 W or more, such as the switching power supply 200 or the switching power supply 100 according to the first exemplary embodiment, it is necessary to take measures to prevent overheating of the switching element.

As means for suppressing overheating of the switching element, a heatsink may be disposed, a switching element with a low on-resistance may be used, and the like. However, most of these means lead to an increase in the size and cost of the switching power supply. Although the power generated by the switching element varies depending on a circuit system, the above means must be applied to all switching elements, and the smaller the number of switching elements used, the lower the size and cost of the circuit. In addition, decreasing the number of switching elements used can also reduce the cost of the control unit.

In a switching power supply that performs complicated control, such as the switching power supply 100 according to the first exemplary embodiment and the switching power supply 200, a control element, such as a general-purpose microcomputer, may be used as the control unit. Since the price of a general-purpose microcomputer tends to increase as the numbers of pins and peripheral functions increase, an inexpensive microcomputer can be used as the number of switch elements to be controlled decreases. In addition, in a circuit system including a high-side switch element, such as a full-bridge circuit and an active-clamp circuit, a circuit for driving the high-side switch element is required. Thus, the fewer the number of switch elements used, the lower the cost of the driving circuit. Therefore, the switching power supply 200 can have a control unit that is inexpensive compared to that of the switching power supply 100 of the first exemplary embodiment.

Unlike the switching power supply 100 according to the first exemplary embodiment, the switching power supply 200 includes only one voltage detection circuit, and the second switch element is located closer to the AC power supply than the rectifier unit. This is for the purpose of disposing the X capacitor CX.

In the switching power supply, an X capacitor may be disposed between the rectifier unit and the AC power supply to prevent a noise voltage generated by the switching power supply from propagating to the AC power supply 10. Since the X capacitor has an equivalent series resistance, there occurs a power loss in the X capacitor connected to the AC power supply. If the power loss occurs while the device equipped with the switching power supply is in a low power consumption (sleep) state, the power consumption of the device during sleep may become excessive. For this reason, the X capacitor may be provided between a first switch element (relay) and the switching power supply, and the first switch element may be turned off during sleep.

However, if a second switch element is provided on the output terminal side of the rectifier unit as in the switching power supply 100 according to the first exemplary embodiment, an inrush current flows into the X capacitor at the moment when the relay becomes conductive even if the second switch element is not conducting. Thus, in order to prevent the inrush current from flowing into the X capacitor, it is necessary to dispose the second switch element closer to the AC power supply than the X capacitor. When the second switch element is disposed between the AC power supply and the rectifier unit, even if a second voltage detection circuit is disposed as in the switching power supply 100 according to the first exemplary embodiment, the second voltage detection circuit cannot detect the voltage of the AC power supply when the second switch element is not conducting. On the other hand, even if there is only one voltage detection circuit and the voltage can be detected only during a half cycle of the AC power supply, it is possible to detect a zero crossing point if the instantaneous voltage value and the slope are known as in the present exemplary embodiment. Therefore, if there is no problem with the time for which the zero crossing point can be detected being half, the second voltage detection circuit is not necessary to control the second switch element as in the present exemplary embodiment.

Therefore, even if the X capacitor is disposed, configuring a circuit as in the present exemplary embodiment and controlling the switch element makes it possible to suppress both an inrush current to the smoothing capacitor and an inrush current to the X capacitor.

According to the present exemplary embodiment, it is possible to provide a switching power supply that can suppress an inrush current when connected to an AC power supply and detect a zero crossing point of the AC power supply regardless of a load.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-121555, filed Jul. 26, 2023, which is hereby incorporated by reference herein in its entirety.

What is claimed is:

1. A switching power supply comprising:

a rectifier unit to which a single-phase alternating-current (AC) power supply having a first phase and a second phase is connected and that is configured to subject the AC power supply to full-wave rectification;

a smoothing capacitor configured to smooth an output voltage of the rectifier unit;

a switching unit disposed in parallel with the smoothing capacitor;

a first switch element provided in the first phase or the second phase;

a second switch element disposed between the rectifier unit and a high potential side of the smoothing capacitor;

a first voltage detection circuit disposed between the first switch element and the rectifier unit;

a second voltage detection circuit provided in one of the first phase and the second phase being opposite to the phase in which the first switch element is provided; and a control unit, wherein the control unit detects zero crossing of the AC power supply based on an output of at least one of the first voltage detection circuit and the second voltage detection circuit, and wherein after having brought the first switch element into conduction, the control unit brings the second switch element into conduction in synchronization with the zero crossing.

2. The switching power supply according to claim 1, wherein a reference potential of the first voltage detection circuit and a reference potential of the second voltage detection circuit are same as a potential of a low potential side of the smoothing capacitor.

3. The switching power supply according to claim 1, wherein the first voltage detection circuit and the second voltage detection circuit become capable of detecting a voltage of the AC power supply when the first switch element becomes conductive.

4. The switching power supply according to claim 1, wherein the switching unit supplies power to an inductive load, wherein the inductive load includes a primary inductance electrically connected to the switching unit and a secondary-side load magnetically connected to the primary inductance, and wherein the secondary-side load generates heat when power is supplied from the AC power supply and the smoothing capacitor via the primary inductance by a switching operation of the switching unit.

5. A switching power supply comprising:

a rectifier unit to which a single-phase alternating-current (AC) power supply having a first phase and a second phase is connected and that is configured to subject the AC power supply to full-wave rectification;

a smoothing capacitor configured to smooth an output voltage of the rectifier unit;

a switching unit disposed in parallel with the smoothing capacitor;

a first switch element provided in the first phase or the second phase;

a second switch element provided in one of the first phase and the second phase being opposite to the phase in which the first switch element is provided;

a voltage detection circuit disposed between the AC power supply and the second switch element; and a control unit, wherein the control unit detects zero crossing of the AC power supply based on an output of the voltage detection circuit, and wherein after having brought the first switch element into conduction, the control unit brings the second switch element into conduction in synchronization with the zero crossing.

6. The switching power supply according to claim 5, further comprising a capacitor between input terminals of the rectifier unit.

7. The switching power supply according to claim 5, wherein a reference potential of the voltage detection circuit is same as a potential of a low potential side of the smoothing capacitor.

8. The switching power supply according to claim 5, wherein the voltage detection circuit becomes capable of detecting a voltage of the AC power supply when the first switch element becomes conductive.

9. The switching power supply according to claim 5, wherein the switching unit supplies power to an inductive load, wherein the inductive load includes a primary inductance electrically connected to the switching unit and a secondary-side load magnetically connected to the primary inductance, and wherein the secondary-side load generates heat when power is supplied from the AC power supply and the smoothing capacitor via the primary inductance by a switching operation of the switching unit.

\* \* \* \* \*